United States Patent [19]

Kerr et al.

[11] 4,093,560

[45] June 6, 1978

[54] ULTRA HIGH SILICON-CONTENT ZEOLITES AND PREPARATION THEREOF

[75] Inventors: George T. Kerr, Trenton; Arthur W. Chester, Cherry Hill, both of N.J.

[73] Assignee: Mobil Oil Corporation, New York, N.Y.

[21] Appl. No.: 688,459

[22] Filed: May 20, 1976

[51] Int. Cl.$^2$ .............................................. B01J 29/06
[52] U.S. Cl. ................... 252/455 Z; 208/120
[58] Field of Search .................. 252/455 Z

[56] References Cited

U.S. PATENT DOCUMENTS 3,442,795   5/1969   Kerr et al. ................. 252/455 Z

*Primary Examiner*—Carl F. Dees

*Attorney, Agent, or Firm*—Charles A. Huggett; Raymond W. Barclay

[57] ABSTRACT

A method is provided for obtaining crystalline dealuminized products by treating a slurry of a crystalline aluminosilicate zeolite in an aqueous solution of an ammonium or alkali metal salt which upon acidification yields an anion which complexes with aluminum by adding to said slurry a water-soluble acid having a first ionization constant greater than $10^{-2}$ at a rate such that a controlled amount of aluminum is removed from the zeolite to yield a resulting product from which at least about 10% and as much as about 85% of the initial aluminum has been removed while retaining more than 60% of the original crystallinity.

11 Claims, No Drawings

ULTRA HIGH SILICON-CONTENT ZEOLITES AND PREPARATION THEREOF

BACKGROUND OF THE INVENTION

1. Field of the Invention

Relates to method for removing aluminum from crystalline aluminosilicate zeolites while retaining high degree of crystallinity to yield products of enhanced thermal stability and improved catalytic characteristics.

2. Description of the Prior Art

It has heretofore been known to effect removal of aluminum from crystalline aluminosilicate zeolites. Thus, utilizing known techniques such as described in U.S. Pat. No. 3,442,795, it has been possible to remove up to about one-half of the tetrahedrally coordinated aluminum from crystalline aluminosilicate zeolites having an initial silica/alumina ratio of at least about 2:1 but less than about 6:1.

One general method which has been used to accomplish such removal of aluminum involves the reaction of the sodium or ammonium form of the zeolite with ethylenediamine-tetraacetic acid ($H_4$EDTA) in accordance with the following equation:

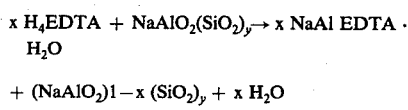

$$+ (NaAlO_2)1-x\,(SiO_2)_y + x\,H_2O$$

where $x < 1$ and $Y > 2.5$

This reaction is conveniently conducted in a Soxhlet extractor. The zeolite, slurried in water, is contained in the flask maintained at an elevated temperature and the $H_4$EDTA is contained in the Soxhlet thimble. In such manner, a dilute solution of the acid is added generally over a 16 to 24 hour period to the zeolite. Attempts to remove more than 50 to 60 percent of th aluminum via this method have resulted in severe losses in crystallinity and thermal stability.

SUMMARY OF THE INVENTION

In accordance with the method of this invention there is provided means for effecting removal of up to 85% or more and in a preferred embodiment from about 70 to about 85% of the aluminum from a crystalline aluminosilicate zeolite having an intial silica/alumina ratio of at least about 2:1 and less than about 6:1 with retention of more than about 60% of the original crystallinity of the zeolite. The technique described herein consists in carefully controlling the rate of addition of a water-soluble acid having a first ionization constant greater than $10^{-2}$ to a slurry of the zeolite in alkali metal or ammonium form, in an aqueous solution of an alkali metal or ammonium salt which upon acidification yields an anion which complexes with aluminum. Suitable salts include the alkali metal and ammonium salts of ethylenediaminetetraacetic acid, such as disodium dihydrogen ethylenediaminetetraacetate and diammonium dihydrogen ethylenediaminetetraacetate; fluorides, such as sodium or ammonium fluoride; carboxylic and polycarboxylic acid salts, such as ammonium acid citrate; mixtures of such complexing agents, etc., including a complexing resin containing an aminodiacetate functional group. Various other complexing agents, containing a variety of anionic portions, may also be used in the process of the present invention provided that they form stable chelates with aluminum. In the case of a complexing agent which is intended to form soluble complexes or chelates for ease of removal of the aluminum from the aluminosilicate, the complexing agent should form a stable complex or chelate with aluminum which is soluble in the medium, e.g. water, in which the complexing is carried out. For a comprehensive review of complexing agents, see "Organic Sequestering Agents" by Stanley Chaberek and Arthur E. Martell, published by John Wiley and Sons, Inc. New York (1959) and an article entitled "Chelation" by Harold F. Walton, Scientific American, June 1953, pp. 68–76, both of which are incorporated herein by reference.

The rate of addition of acid is controlled such that between about 5 and about 15 percent and preferably about 10% of the original zeolite tetrahedral aluminum is removed per day. Utilizing disodium dihydrogen ethylenediaminetetraacetate as the salt and hydrochloric acid as a typical treating acid, the reaction is believed to proceed in accordance with the following equation:

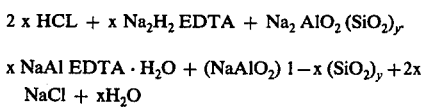

$$x\,NaAl\,EDTA \cdot H_2O + (NaAlO_2)\,1-x\,(SiO_2)_y + 2x\,NaCl + xH_2O$$

The products of the latter reaction differ from those of the previously employed reaction utilizing ethylenediaminetetraacetic acid in that sodium chloride is formed in addition to the other products. Thus, the effect of the hydrochloric acid is diminished as the reaction proceeds since the hydronium ion now competes with additional sodium ion, i.e. in addition to sodium ion derived from the sodium zeolite, sodium ion from $Na_2H_2$EDTA is present in solution.

Thus, following the teachings of this invention, it has been found that a controlled rate of addition of hydronium ion and thereby the rate of removal of aluminum from the zeolite is essential in retaining a high degree of crystallinity and affording a product of enhanced thermal stability over the corresponding zeolite characterized by a lower silica/alumina ratio. Without being limited by any theory, it is postulated that silicon atoms or ions migrate into sites vacated by aluminum. It is likely that this is a slow process at 100° C. Thus, if removal of aluminum proceeds at a faster rate than the migration of silicon into defect sites, then the crystal structure collapses. Should the exchange of hydronium ion into the zeolite and thus removal of framework aluminum proceed at a rate equal to or somewhat less than the rate of silicon migration, then the zeolite can "heal" itself and retain most of its crystallinity even up to quite high levels of aluminum removal.

The term "crystallinity" when used in the specification and claims has its usual connotation and is measured by comparing the X-ray diffraction spectra of the treated product with that of the zeolite starting material, both such product and starting material having been calcined in air at 1000° F. The relative crystallinity is measured by comparing the area under the peaks of greatest intensity and represents the average ratios of the areas under corresponding peaks for the materials being compared. This may be stated in the form of the equation:

$$A_{tm}/A_{sm} \times 100 = \%\text{ crystallinity}$$

where $A_{tm}$ represents the total area under the most intense peaks for the treated material and $A_{sm}$ represents the total area under the corresponding peaks for the starting material.

The crystalline dealuminized products obtained by the method described herein are modified to the extent that there is a shift to shorter metal-oxygen interatomic distances, measured as lattice cell constant, $a_o$, generally expressed in Angstrom units. Thus, for zeolite Y (silica/alumina ratio of about 5), the lattice cell constant is 24.795A. With removal of about 80% of the aluminum from zeolite Y (silica/alumina ratio of about 25), the lattice cell constant decreases to 24.335. It is believed that the observed shift to shorter metal-oxygen interatomic distances with the zeolites of high silica/alumina accounts, at least in part, for their enhanced thermal stability.

The zeolites treated in accordance with the present invention are characterized in their dehydrated form by the following general formula:

$$M_2O/n) : Al_2O_3 : w\ SiO_2$$

where M is a cation which balances the electrovalence of the tetrahedra, n represents the valence of the cation and w the moles of $SiO_2$. Cation M is generally an ammonium or alkali metal, e.g. sodium cation. The silica/alumina ratio, i.e. w, should be at least about 2:1 initially and preferably at least about 4:1 but less than about 6:1. The crystalline products resulting after the described treatment may have a silica/alumina ratio as high as 25/1 or higher.

Representative of the zeolites which may be effectively treated by the present method are zeolites A, X, Y and natural faujasite. Zeolite Y generally having a silica/alumina ratio of at least about 4:1 but less than about 6:1 is particularly susceptible to treatment utilizing the described technique.

A slurry of the zeolite is prepared in an aqueous solution of an ammonium or alkali metal salt which upon acidification yields an anion which complexes with aluminum. The amount of zeolite contained in such slurry will generally be between about 5 and about 60 weight percent. The concentration of the applicable salt solution is usually between about 10 and about 50 weight percent.

A water-soluble acid is added to the resulting slurry. The acid may be inorganic or organic and of such concentration that the controlled addition thereto to the zeolite-containing slurry does not serve to reduce the pH thereof to below a point where the crystallinity of the zeolite would be adversely affected, i.e. to a pH of below about 3. It is essential that the acid employed be stronger than ethylenediaminetetraacetic acid and thus have a first ionization constant greater than $10^{-2}$.

Typical inorganic acids which can be employed include mineral acids such as hydrochloric, sulfuric, nitric and phosphoric acids, peroxydisulfonic acid, dithionic acid, sulfamic acid, peroxymonosulfuric acid, amidodisulfonic acid, nitrosulfonic acid, chlorosulfuric acid, pyrosulfuric acid, and nitrous acid. Representative organic acids which may be used include formic acid, trichloroacetic acid, and trifluoroacetic acid.

The concentration of added acid should be such as not to lower the pH of the reaction mixture to an undesirably low level which could affect the crystallinity of the zeolite undergoing treatment. The acidity which the zeolite can tolerate will depend, at least in part, upon the silica/alumina ratio of the starting material. Generally, the pH in the reaction mixture should be greater than about 4 and preferably greater than about 4.5 where the silica/alumina ratio of the starting material is greater than about 2 but less than about 3. When the silica/alumina ratio of the starting material is greater than about 3 but less than about 6, the pH of the reaction mixture should be greater than about 3.

The above-described acid is added to the slurry of zeolite in aqueous solution of the ammonium or alkali metal complexing salt at a rate such that between about 5 and about 15% aluminum is removed per day. Preferably about 10% aluminum is removed per day as a result of the specified treatment. The temperature of the reaction mixture may range from about 20° C. up to temperatures below the decomposition temperature of the aluminosilicate. The use of higher temperatures within this range tend to accelerate the removal of aluminum.

After the described treatment, the product is water washed free of impurities, preferably with distilled water, until the effluent wash water has a pH within the approximate range of 5 to 8. The crystalline dealuminized products obtained by the method of this invention have substantially the same crystallographic structure as that of the starting aluminosilicate zeolite but with increased silica/alumina ratios.

The dealuminized crystalline aluminosilicate products obtained exhibit unusual catalytic properties particularly for transforming organic compounds which are catalytically convertible in the presence of acidic catalyst sites into modified organics. For example, they are useful in a wide variety of hydrocarbon conversion processes including dealkylation, alkylation, isomerization, disproportionation, hydration of olefins, amination of olefins, hydrocarbon oxidation, dehydration of alcohols, dehydrogenation, desulfurization, hydrogenation, hydroforming, reforming, cracking, hydrocracking, oxidation, polymerization, aromatization and the like. The catalysts are especially stable and are particularly applicable for use in each of the above and related processes carried out at temperatures ranging from ambient temperatures of 70° F. up to 1400° F., including such processes in which the catalyst is periodically regenerated by burning off combustible deposits.

The catalysts constituting the dealuminized crystalline aluminosilicate products described herein are particularly useful for cracking petroleum hydrocarbons and especially petroleum gas oils to lighter materials boiling in the gasoline range. In utilizing the catalyst for such purpose, it is comtemplated that cracking may be achieved in either a stationary or moving bed, including fluidized, operation under conventional cracking conditions.

The catalysts described hereinabove are also applicable for hydrocracking of heavy petroleum residual stocks, cycle stocks, etc. wherein the catalyst is promoted with about 0.05 to 10% by weight of a platinum metal such as palladium, platinum, rhodium, osmium, rhenium, ruthenium, or with oxides or sulfides of metals such as cobalt, molybdenum, tungsten, chromium, iron, copper and the like. the petroleum feedstock is cracked in the presence of the catalyst at temperatures between 400° and 825° F. at a pressure between about 10 and and about 2500 psig, utilizing a molar ratio of hydrogen to hydrocarbon in a range between about 2 and about 80.

When the dealuminized crystalline aluminosilicate is synthesized in the alkali metal form, the zeolite may readily be converted to other cationic forms by means of conventional ion exchange. When the dealuminized product is intended for use as a cracking catalyst, the original alkali metal content thereof is desirably reduced by ion exchange to less than about 1.5 percent by weight. Thus, the original alkali metal of the zeolite may be replaced by ion exchange with ammonium, hydrogen or other suitable ions from Groups IB to VIII of the Periodic Table including by way of example, nickel, copper, zinc, palladium, calcium or rare earth metals.

In practicing the desired conversion process, it may be desirable to incorporate the above-described dealuminized crystalline aluminosilicate zeolite in another material resistant to the temperature and other conditions employed in the process. Such matrix materials include synthetic or natural substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, hich families include the sub-bentonites of the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix may vary widely with the zeolite content ranging from between about 1 to about 99 percent by weight and more usually in the range of about 5 to about 80 percent by weight of the composite.

DESCRIPTION OF SPECIFIC EMBODIMENTS

The following examples will serve to illustrate the method of the invention without limiting the same:

EXAMPLE 1

50 grams of ammonium zeolite Y containing 7.47 percent $NH_3$ were slurried with 51.8 ml. of a 1 Molar solution of diammonium dihydrogen ethylenediaminetetraacetate and 300 ml. of water. The mixture was stirred and refluxed while 33.3 ml. of 3.14 Normal hydrochloric acid solution were pumped continuously into the zeolite slurry over a period of 3.3 days. The zeolite was then collected on a Büchner funnel and washed with one liter of water.

The above treatment was conducted two more times. Small aliquot samples of the reaction mixture were removed at the conclusion of the first treatment and during the last two HCl additions. Elemental and X-ray diffraction analyses were performed on the zeolite samples. The results are set forth below in Table I:

Thermal stability of the samples of zeolite Y, as determined by the DTA test, described by G. T. Kerr in Journal of Physical Chemistry, Vol. 72, page 2594 (1968), increased as the silica/alumina ratio increased. Thus Sample 10 having a silica/alumina ratio of 25.2 with 80 percent aluminum removal was stable, i.e. retained crystallinity up to a temperature of 1260° C. A portion of the latter zeolite Y (silica/alumina of 25.2) was treated with 3Normal HCl solution at reflux for 18 hours to yield a 46% crystalline material having a lattice cell constant of 24.259A, which still retained crystallinity after heating to 1272° C. This material had a silica/alumina ratio of at least 50 and possibly higher.

EXAMPLE 2

A commercial sodium Y zeolite, containing 61.0% wt $SiO_2$, 18.9% wt $Al_2O_3$ and 8.8% wt Na was calcined in air at 500° C. Five hundred grams of the calcined zeolite was slurried with a solution of 150 grams rare earth chloride hexahydrate in 1500 cc distilled water and the slurry stirred for 15 minutes at 180° F. The slurry was filtered and the wet cake reslurried with fresh rare earth solution (150 gms $RECl_3.6H_2O$ in 1250 cc water), then stirred at 180° F for an additional 15 minutes. The slurry was filtered and the solid washed with 1500 cc water. The solid was dried at 250° F, then calcined in air for 3 hours at 1200° F. The calcined, rare earth exchanged zeolite contained 59.8% wt $SiO_2$, 19.2% $Al_2O_3$, 3.2% wt Na and 14.5% $RE_2O_3$.

The rare earth exchanged zeolite (12.5%) was then incorporated in a silica-clay matrix (87.5%) consisting of 60% $SiO_2$ and 40% kaolin clay as follows:

930.2 grams Georgia kaolin clay were added to 45.2 pounds of deionized water and the whole was mixed thoroughly. Then 4167 grams of Q-Brand sodium silicate (containing 800grams $SiO_2$) were added to the clay-water slurry over a period of 30 minutes. The whole was heated to 120° F and sufficient concentrated sulfuric acid (95.9% wt $H_2SO_4$) was added while mixing to reduce the pH to 10.9. The entire mixture was stirred for 1 hour at 120° F. The mixture was cooled and sufficient concentrated sulfuric acid was added to reduce to pH to 4.5. Then 281 grams of the calcined rare earth exchanged zeolite Y was added, the mixture was homogenized and spray dried (inlet gas to spray drier about 700° F and outlet gases about 350° F).

The spray dried composite was slurried with water and the excess water decanted. The composite was then placed in a cylindrical ion exchange column and exchanged with 10 gallons of 5% ammonium sulfate solution, then washed with water until all the sulfate had been removed. The wet cake was then slurried with a solution of 375 grams rare-earth chloride hexahydrate dissolved in 5000 cc deonized water, the whole stirred for one hour and then filtered. The product was not washed but immediately dried at 250° F. The dried catalyst contained 0.08% Na and 4.96% $RE_2O_3$. The mean diameter of the particles was 75 microns. After calcination at 1200° F, the pore volume was 0.61 cc/gm, the packed density was 0.58 gm/cc and the surface area was 364 $m^2$/gm.

EXAMPLE 3

The sodium Y zeolite used in Example 2 was treated for aluminum removal as follows: Seven hundred grams of the zeolite was placed in a flask fitted with an electric heating mantle, a stirrer, a reflux condenser and a controlled rate addition funnel. To the zeolite were added 3 liters distilled water and 346 grams of diammonium dihydrogen ethylenediaminetetraacetate. Over a period of 80 hours, 945 ml of 2.25 N hydrochloric acid was added dropwise at a uniform rate from the addition funnel while the slurry was continuously heated at reflux and continuously stirred. After the acid addition was complete, the mixture was heated and stirred for two additional days, then filtered. The product zeolite was washed with water and air dried. Analysis of the dealuminized product gave 72.0% wt $SiO_2$, 17.3% wt $Al_2O_3$ and 4.0% wt Na.

The dealuminized zeolite Y was rare earth exchanged and calcined in the manner described in Example 2. The calcined zeolite contained 69.4% $SiO_2$, 16.1% $Al_2O_3$, 2.4% Na and 12.3% $RE_2O_3$. Based on the analysis of the rare earth Y from Example 2 and the rare earth exchanged dealuminized Y, about 28% of the aluminum had been removed.

The calcined rare earth dealuminized Y (12.5%) was incorporated into a silica-clay matrix (87.5%) in an identical manner to the preparation decribed in Example 2. The dried catalyst contained 0.05% Na and 4.34% $RE_2O_3$. The mean diameter of the particles was 68 microns. After calcination at 1200° F, the pore volume was 0.62 cc/gm, the packed density was 0.58 gm/cc and the surface area was 339 $m^2$/gm.

EXAMPLE 4

The catalysts of Examples 2 and 3 were steamed at 1400° F for 4 hours with 100% steam at 0 psig in a fluidized bed. The steamed catalysts were then tested for cracking activity and selectivity with a wide-cut Midcontinent gas oil at about 920° F, 3 catalyst/O and 8.33 WHSV in a fixed fluidized bed. The product distributions obtained are given in the Table II below.

Table II

| Example No. | 2 | 3 |
|---|---|---|
| Test Results: | | |
| Conversion, % vol. | 73.7 | 76.4 |
| $C_5+$ Gasoline, % vol. | 65.2 | 67.8 |
| Total $C_4$'s, % vol. | 13.0 | 13.2 |
| Dry Gas, % wt | 5.6 | 4.9 |
| Coke, % wt | 1.97 | 1.85 |
| $C_5+$ Gasoline/Conversion | 0.885 | 0.887 |
| Conversion/Coke | 37.4 | 41.3 |

It will be seen from the above results that the slow removal of aluminum in Example 3 produced a catalyst that is more active, makes more gasoline and less coke than the zeolite prior to aluminum removal.

We claim:

1. A method of removing aluminum from a crystalline aluminosilicate zeolite characterized by an initial silica/alumina ratio of at least about 2:1 but less than about 6:1 which comprises preparing a slurry of said zeolite in alkali metal or ammonium form in an aqueous solution of an ammonium or alkali metal salt which upon acidification yields an anion which complexes with aluminum, adding to said slurry a water-soluble acid having a first ionization constant greater than $10^{-2}$ at a rate such that between about 5 and about 15 percent aluminum is removed per day to yield a resulting product which at least about 70 percent and as much as about 85 percent of the initial aluminum has been removed while retaining more than about 60 percent of the original crystallinity.

2. The method of claim 1 wherein said acid is a mineral acid.

3. The method of claim 2 wherein said mineral acid is hydrochloric acid.

4. The method of claim 1 wherein said zeolite is zeolite Y.

5. The method of claim 1 wherein said salt is an ammonium or alkali metal ethylenediaminetetraacetate.

6. The method of claim 1 wherein said salt is disodium dihydrogen ethylenediaminetetraacetate.

7. The method of claim 1 wherein said salt is diammonium dihydrogen ethylenediaminetetraacetate.

8. The method of claim 1 wherein said rate is such that about 10 percent aluminum is removed per day.

9. A crystalline product obtained by the method of claim 1.

10. A crystalline product obtained by the method of claim 4.

11. A crystalline product obtained by the method of claim 5.

* * * * *